UNITED STATES PATENT OFFICE.

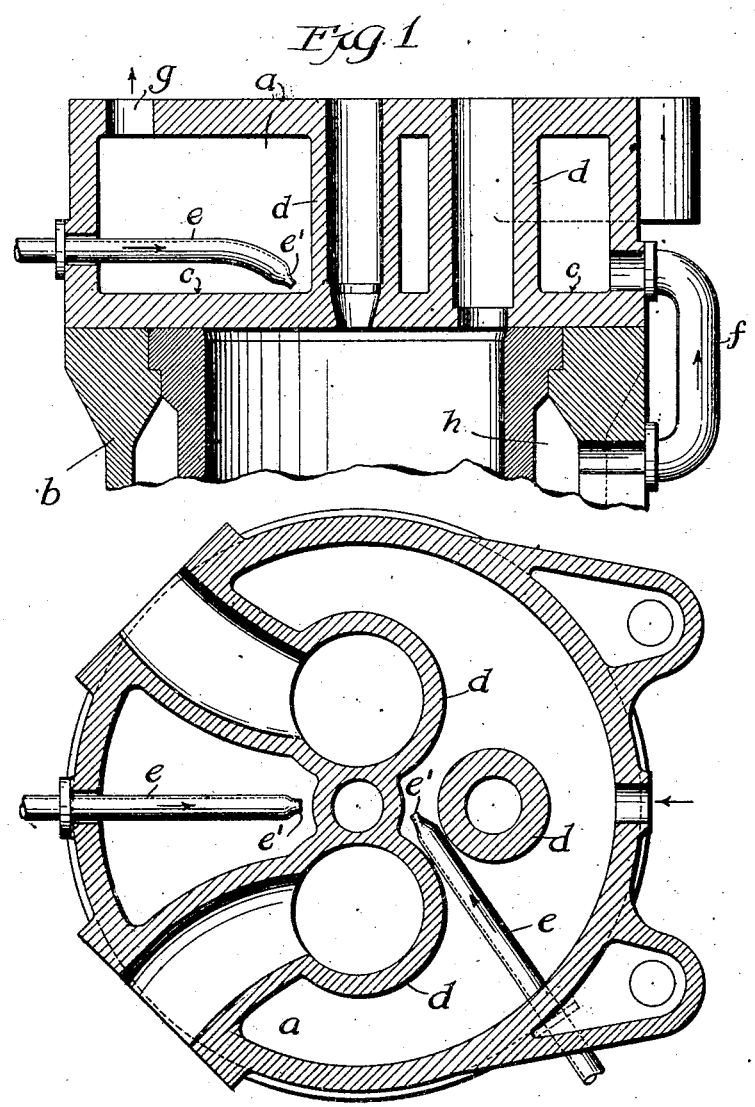

JOHANN FÜLSCHER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

WATER-COOLED INTERNAL-COMBUSTION ENGINE.

1,245,578.

Specification of Letters Patent.   Patented Nov. 6, 1917.

Application filed November 18, 1914.  Serial No. 872,697.

*To all whom it may concern:*

Be it known that I, JOHANN FÜLSCHER, a citizen of the Republic of Switzerland, residing at Winterthur, Canton of Zurich, Switzerland, have invented the following-described Improvements in Water-Cooled Internal-Combustion Engines.

The invention relates to internal combustion engines, and more particularly to the water-cooling provisions thereof. When the water circulated through the water-jackets of these engines contains lime, scale is formed on the surfaces, and, being a poor conductor of heat, prevents proper cooling of the cylinder walls, with consequent overheating of the parts so coated and impairment of the working and wearing qualities of the engine. The object of the present invention is to prevent the deposition of scale upon those surfaces of engine water-jackets which are particularly subject to the formation of deposits and where the presence of scale would be injurious, or to remove deposits which may already have been formed. Regions particularly exposed to scale formation are the lower lying or upward facing surfaces, where gravity assists the deposition of solids, and more especially the bottoms of the water-cooling spaces of cylinder covers. Such surfaces are protected, under this invention, by the provision of means whereby part or all of the water for cooling is injected into the space in the vicinity of these surfaces in the form of small, high velocity streams, serving not only to prevent particles lodging on the surfaces but by the rapid motion imparted to such particles to cause them to exert a scouring action, capable of displacing other particles which may have found a resting place or of removing coatings previously formed.

In the accompanying drawings:

Figure 1 is a vertical section through the upper part of a cylinder of an engine, showing the cooling space in the cylinder cover provided with an embodiment of the means for preventing scale; and Fig. 2 is a horizontal section through the same.

A single cylinder of a vertical internal combustion engine is indicated at $b$ and its side water-jacket space at $h$. $a$ is a hollow cylinder cover, the interior of which forms part of the water-jacket. The bottom wall $c$ of this space, lying next to the combustion chamber, is especially susceptible to the formation of scale; and the presence of vertical walls $d$, inclosing valve openings, etc., furnish further possibilities for a serious scale adhesion.

In order to overcome the difficulty, part or all of the water necessary for the cooling of the cylinder cover is introduced through one or more pipes $e$, projecting into the cooling space in proximity to the exposed surfaces. These pipes, or the nozzles $e'$ with which they terminate, are of such restricted diameter that the water passes from them with great velocity, thus sweeping away the solid particles which would otherwise settle, and at the same time causing them to scrub off any adhesions which may have formed. In the particular illustration contained in the drawings, the outlets are shown directed obliquely downward against the region where the vertical walls $d$ join the bottom. As seen in Fig. 1, part of the water for the cylinder cover may be supplied in the ordinary manner, through a pipe $f$ of large diameter, leading from the side water-jacket. While two of the water-injecting conduits $e$ are shown, it will be understood that the number and arrangement may be varied as may be found most effective with different forms of cylinder covers and valve openings.

What is claimed as new is:

1. In a water-jacketed internal combustion engine, means for injecting a stream or streams of high velocity into the water-jacket in the vicinity of upward-facing surfaces exposed to the deposition of solids, whereby deposition on said surfaces is avoided and the loose particles set in rapid motion are caused to have a scouring action.

2. An internal combustion engine having, in combination, a water-jacket and one or more water-supply pipes projecting into said space and terminating in restricted nozzles adjacent upward-facing surfaces exposed to formation of scale in order to expose said surfaces to a vigorous scouring action.

3. A water-jacketed cylinder cover for internal combustion engines having a water-supply passage terminating in a restricted nozzle directed toward and in proximity to its bottom so as to deliver a stream of high velocity thereagainst to prevent the deposition and effect the removal of scale.

4. A water-jacketed cylinder cover having one of more walls therein inclosing valve openings, and one or more restricted water-supply nozzles directed toward and in proximity to the junctions between said walls and the bottom of the cover in order to deliver streams of high velocity against the same.

5. In an internal combustion engine, means inclosing a water-cooling space, and means for supplying said space in part through a passage of comparatively large diameter and in part through one or more restricted nozzles arranged to inject streams of high velocity against upward-facing surfaces exposed to formation of scale.

In testimony whereof, I have signed this specification in the presence of two witnesses.

JOHANN FÜLSCHER.

Witnesses:
 CARL GUBLER,
 ARLON T. ADAMS.